US009745917B2

(12) United States Patent
Poxhofer

(10) Patent No.: US 9,745,917 B2
(45) Date of Patent: Aug. 29, 2017

(54) MULTI-PART CRANKCASE AND ASSEMBLY METHOD

(71) Applicant: Steyr Motors GmbH, Steyr (AT)

(72) Inventor: Markus Poxhofer, Steyr (AT)

(73) Assignee: Steyr Motors GmbH, Steyr (AT)

( * ) Notice: Subject to any disclaimer, the term of this patent is extended or adjusted under 35 U.S.C. 154(b) by 116 days.

(21) Appl. No.: 14/573,941

(22) Filed: Dec. 17, 2014

(65) Prior Publication Data

US 2015/0167585 A1 Jun. 18, 2015

(30) Foreign Application Priority Data

Dec. 18, 2013 (DE) .................. 10 2013 114 318

(51) Int. Cl.
*F02F 7/00* (2006.01)
*B23P 19/04* (2006.01)

(52) U.S. Cl.
CPC .......... *F02F 7/0002* (2013.01); *B23P 19/042* (2013.01); *F02F 7/0012* (2013.01); *F02F 7/0021* (2013.01); *F02F 7/0053* (2013.01); *F02F 2200/00* (2013.01); *Y10T 29/49231* (2015.01)

(58) Field of Classification Search
CPC .......... F02F 1/24; F02F 7/0021; F02F 7/0053; F02F 7/0012; F02F 7/0073; F02F 7/0095; F02F 2007/0041; F02F 1/045; F02F 1/102
USPC ................ 123/193.3, 193.5, 195 R
See application file for complete search history.

(56) References Cited

U.S. PATENT DOCUMENTS

| 1,836,189 | A | | 12/1931 | Salisbury | |
|---|---|---|---|---|---|
| 4,497,289 | A | * | 2/1985 | Bortolussi | F01L 1/0532 123/193.5 |
| 5,069,176 | A | * | 12/1991 | Ruf | F02F 1/00 123/193.3 |
| 6,233,807 | B1 | | 5/2001 | Werner | |
| 7,131,419 | B2 | * | 11/2006 | Nakamura | F02F 7/0053 123/195 H |

(Continued)

FOREIGN PATENT DOCUMENTS

| DE | 19545610 | 6/1997 |
|---|---|---|
| DE | 29719892 | 12/1997 |

(Continued)

*Primary Examiner* — Hai Huynh
*Assistant Examiner* — Long T Tran
(74) *Attorney, Agent, or Firm* — Akerman LLP; Peter A. Chiabotti

(57) ABSTRACT

Described is a crankcase and a method for assembling a multi-part crankcase. The method can include providing a cylinder block and a bearing tunnel upper part. The cylinder block has a plurality of threaded holes into each of which a stud screw is screwed, where the stud screws protrude from the cylinder block. The bearing tunnel upper part has a plurality of through-holes, where each of the through-holes is arranged coaxially to a corresponding stud screw. On a side facing the cylinder head, each of the through-holes has an internal thread having a first direction of rotation. A plurality of threaded sleeves, each threaded sleeve has an internal thread that has a second direction of rotation, an external thread that has a first direction of rotation, and a driver profile for inserting a screwdriver tool in a positive-locking manner, are provided.

18 Claims, 8 Drawing Sheets

(56) References Cited

U.S. PATENT DOCUMENTS

| | | | | |
|---|---|---|---|---|
| 8,695,561 B2* | 4/2014 | Fujiwara | ............... | F02F 7/0007 |
| | | | | 123/193.2 |
| 2002/0015617 A1* | 2/2002 | Schwenkel | ............ | F16J 15/061 |
| | | | | 403/329 |
| 2004/0200053 A1* | 10/2004 | Takahashi | ............. | F02F 7/0053 |
| | | | | 29/527.5 |
| 2009/0260595 A1* | 10/2009 | Fujiwara | ............... | F02F 7/0007 |
| | | | | 123/197.4 |

FOREIGN PATENT DOCUMENTS

| | | |
|---|---|---|
| DE | 102012011322 | 12/2013 |
| EP | 1843029 | 10/2007 |

* cited by examiner

Detail III

MULTI-PART CRANKCASE AND ASSEMBLY METHOD

CROSS REFERENCE TO RELATED APPLICATION

This application claims priority to German Patent Application No. DE 10 2013 114 318.0 filed Dec. 18, 2013, which is hereby incorporated by reference in its entirety.

TECHNICAL FIELD

The present application lies in the field of engine construction and relates in particular to a multi-part crankcase that can be screwed together, for example for a V engine.

BACKGROUND

It is known in the field of reciprocating internal combustion engines to assemble the crankcase from a plurality of components. Multi-part crankcases are used, for example, if for strength reasons or weight reduction reasons, individual parts are produced from a different material (e.g. aluminum) than other parts. For example, the publication EP 1 843 029 A2 (Title: "Composite cylinder case") describes a crankcase, wherein a cylinder block is screwed together with a cast iron part that is designated as "Kurbelraumeinheit" ("crank chamber unit"). A reinforcement element which forms the bearing tunnel upper part for the crankshaft is cast in the cast iron part. A bearing cap that is screwed to the reinforcement element forms the bearing tunnel lower part.

Crankcases composed of a plurality of components which have to be screwed together can result in an increased assembly effort in production. It is therefore an object of the application to provide a multi-part crankcase that requires comparatively little assembly effort.

SUMMARY

The aforementioned object is achieved by a method and a crankcase according to the claims. Exemplary configurations and refinements thereof are the subject matter of the dependent claims.

A method for assembling a multi-part crankcase is disclosed below. According to one embodiment, the method comprises providing a cylinder block and a bearing tunnel upper part. The cylinder block has a plurality of threaded holes into each of which a stud screw is screwed, wherein the stud screws protrude from the cylinder block. The bearing tunnel upper part has a plurality of through-holes, wherein each of the through-holes is arranged coaxially to a corresponding stud screw. On a side facing the cylinder block, each of the through-holes has an internal thread having a first direction of rotation. Furthermore, a plurality of threaded sleeves are provided. Each threaded sleeve has an internal thread having a second direction of rotation, an external thread having a first direction of rotation, and a driver profile for inserting a screwdriver tool in a positive-locking manner. The bearing tunnel upper part, the cylinder block and the threaded sleeves are positioned relative to one another in such a manner that the threaded sleeves are arranged between and coaxially to the stud screws and the through-holes. A screwdriver tool is inserted through one of the through-holes into at least one driver profile of one of the threaded sleeves. By rotating the threaded sleeve, the threaded sleeve is screwed into the internal thread of the through-hole and, at the same time, is screwed onto the stud screw.

Furthermore, a crankcase is described which is particularly suitable for a V engine. According to a further example, the crankcase comprises at least one cylinder block having a plurality of threaded holes into each of which a stud screw is screwed, wherein the stud screws protrude from the cylinder block. The crankcase further comprises a bearing tunnel upper part having at least two bearing blocks arranged along a longitudinal axis and having a plurality of through-holes. Each of the through-holes is arranged coaxially to a corresponding stud screw and, on a side facing the cylinder head, each of the through-holes has an internal thread having a first direction of rotation. Furthermore, a plurality of threaded sleeves are provided, each with an external thread that has the first direction of rotation, with an internal thread that has the second direction of rotation and with a driver profile for inserting a screwdriver tool in a positive-locking manner. The external thread of each threaded sleeve is screwed into the internal thread of the corresponding through-hole, and the internal thread of each threaded sleeve is screwed onto a corresponding stud screw.

A further cylinder block can be screwed together with the bearing tunnel upper part, in the same manner as the first cylinder block. According to the example described here, a bearing tunnel lower part is screwed together with the bearing tunnel upper part in such a manner that the bearing blocks arranged in the bearing tunnel upper part and the bearing caps arranged in the bearing tunnel lower part form corresponding bearing points for the crankshaft.

BRIEF DESCRIPTION OF THE FIGURES

The disclosed embodiments are explained in more detail below by means of the examples illustrated in the figures. The illustrations are not necessarily true to scale and the application is not limited only to the illustrated aspects. Rather, emphasis is placed on illustrating the principles underlying the application. In the figures.

In the figures, the same reference numerals designate the same or similar components each with the same or similar function.

DETAILED DESCRIPTION

Figure 1:
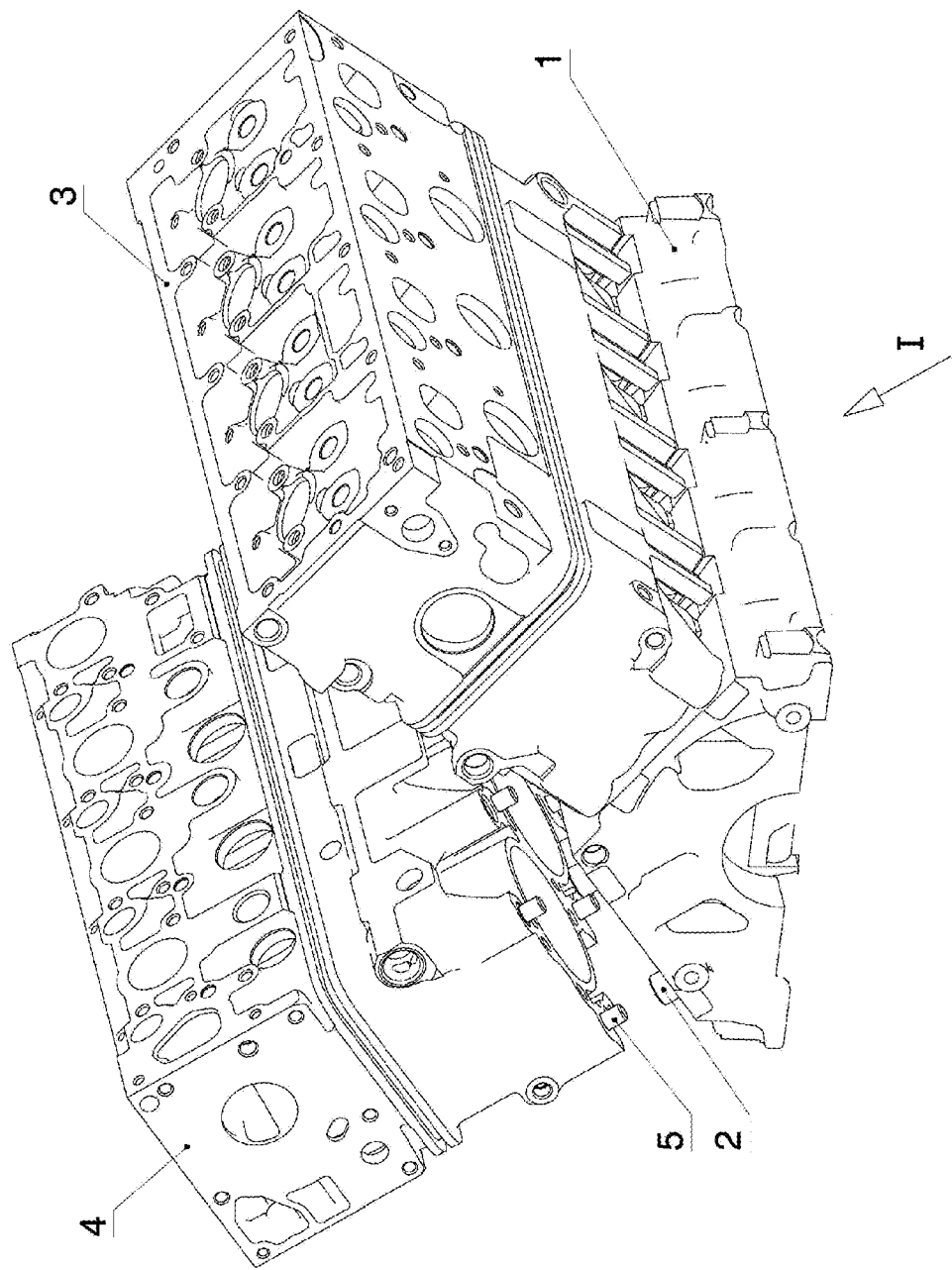
FIG. 1 shows an example of a crankcase in an isometric illustration with two cylinder blocks and a bearing tunnel upper part during assembly (the bearing tunnel lower part is not illustrated)

FIG. 1 is an isometric illustration of a crankcase of a V engine. However, the principles explained here can also be applied to other designs of reciprocating internal combustion engines. The illustrated example comprises a first casting, which constitutes a bearing tunnel upper part 1, and two cylinder blocks 3 and 4. The first cylinder block 3 is already illustrated in the assembled state in which the cylinder block is screwed together with the bearing tunnel upper part 1. In the example illustrated in FIG. 1, the second cylinder block 4 is still in an intermediate state during assembly. The stud screws (e.g. according to DIN 938) (pre-assembled on the cylinder block) by means of which the second cylinder block 4 is screwed to the bearing tunnel upper part 1 are designated by the numeral 5. The specific structure of the bearing tunnel upper part 1 and the cylinder block 4 as well as the assembly process are explained in more detail by means of the following FIGS. 2 to 4.

Figure 2:
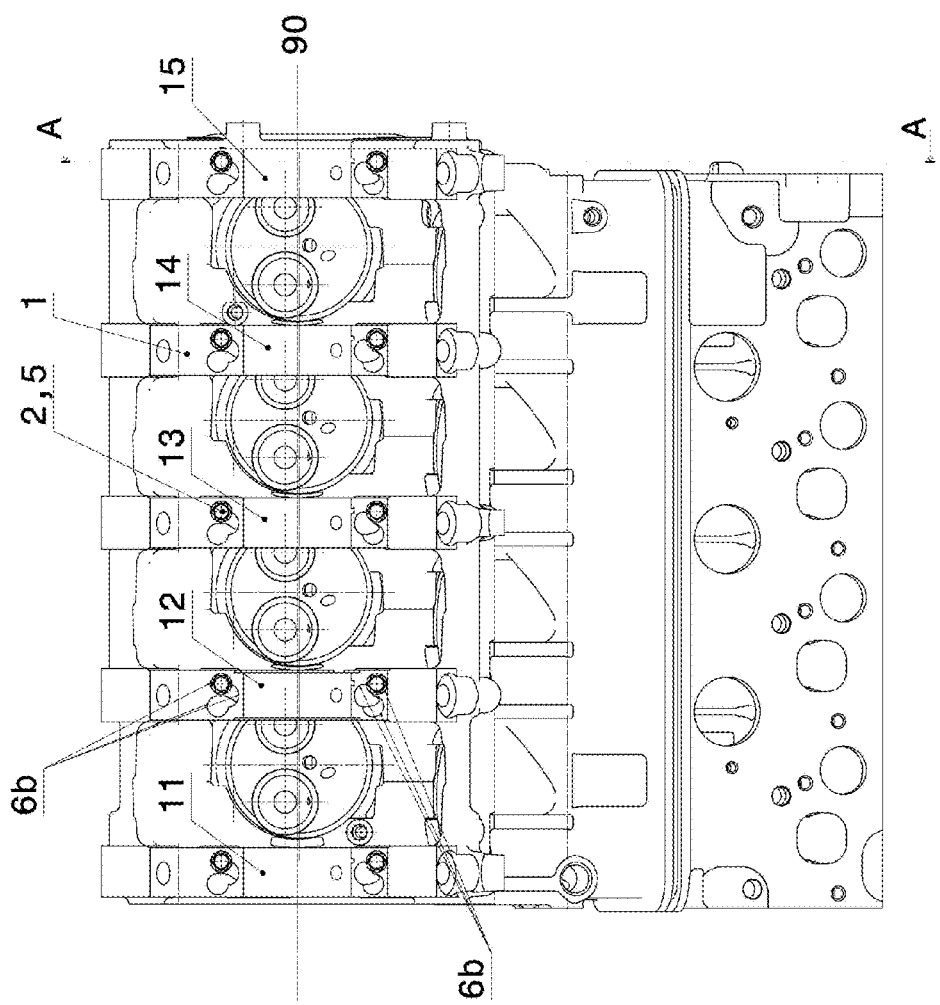
FIG. 2 shows the example from FIG. 1 in a view from below.

FIG. 2 is a view of the crankcase from FIG. 1 in a direction indicated by the arrow "I" (see FIG. 1). FIG. 2 also shows a view from below in the direction of the longitudinal axes 40 (see also FIG. 3) of the cylinder bores in the cylinder block 4. In FIG. 2, the individual bearing points forming the bearing tunnel can be seen. The bearing blocks 11, 12, 13, 14 and 15, which together with the bearing tunnel lower part 8 (also referred to as bedplate, not illustrated in FIGS. 1-4) form the bearing points for the crankshaft (e.g. sliding bearings), are arranged in the bearing tunnel upper part 1.

Through-holes 7 through the bearing tunnel upper part 1 are arranged to the left and to the right of the longitudinal axis 10 of the bearing tunnel upper part 1 (and in a direction perpendicular to the longitudinal axis) and next to the bearing blocks 11-15 in the direction of the cylinder block 4. In the present example, a through-hole 7 is provided on both sides of the bearing block at each bearing point of the bearing tunnel upper part 1. The longitudinal axes of the through-holes 7 are coaxial to the stud screws 5 screwed into the associated cylinder block 4 (see FIG. 1) and are substantially parallel to the longitudinal axes 40 of the cylinders. The through-holes 7 and the stud screws 5 are more clearly shown in the cross-sectional illustration from FIG. 3. The associated sectional plane A-A is illustrated in FIG. 2.

Figure 3:
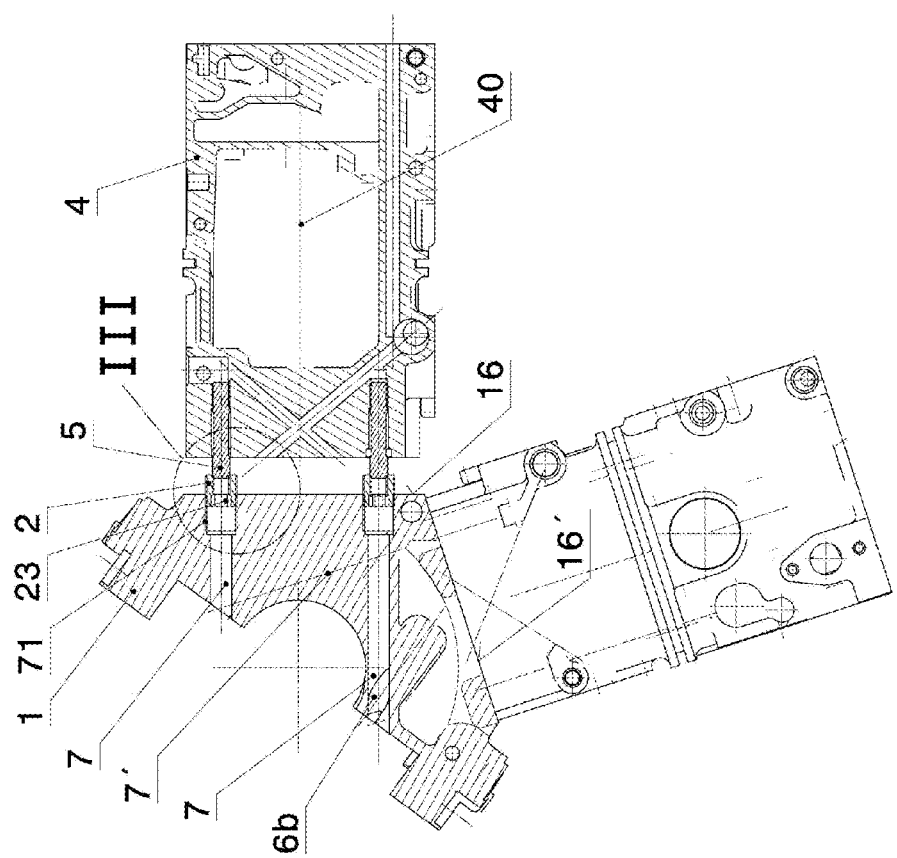
FIG. 3 shows the example from FIG. 1 in a cross-sectional illustration, with the cylinder block not completely assembled yet.
Figure 4:
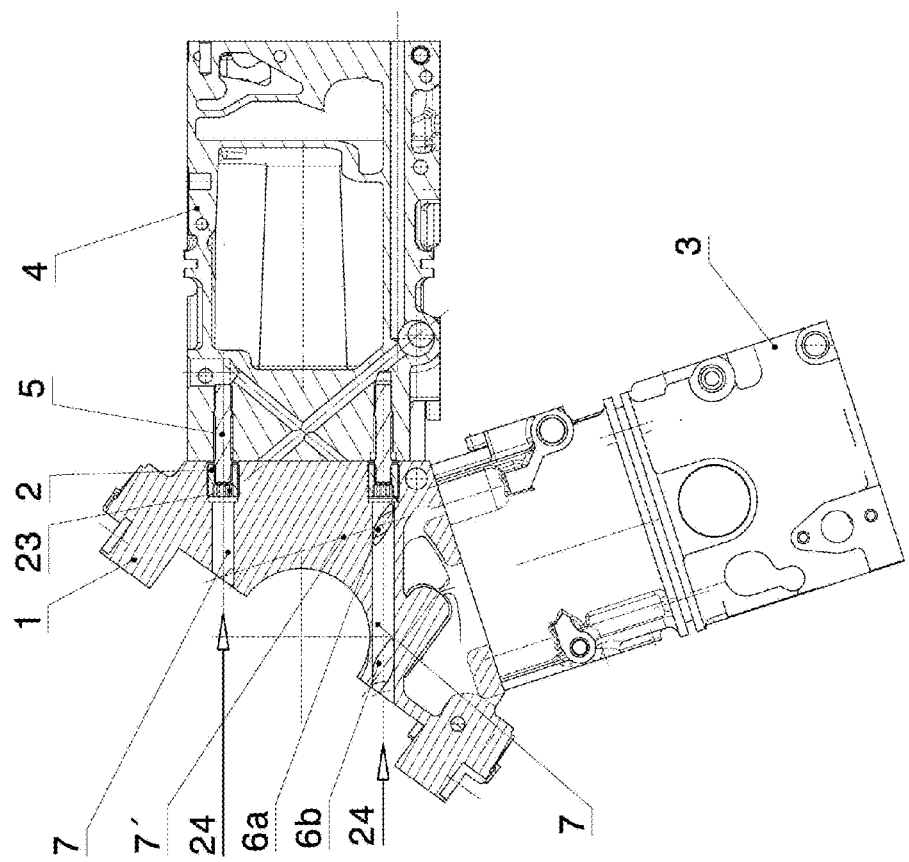
FIG. 4 shows a view of the crankcase corresponding to the cross-sectional illustration from FIG. 3, with the cylinder block assembled.

Screwing the cylinder block 4 to the bearing tunnel lower part is explained by means of the cross-sectional illustrations in FIGS. 3 and 4. For the sake of simplicity, only the through-holes 7 for the cylinder block 4 are illustrated in the FIGS. 3 and 4. However, the longitudinal axes (designated by 7') of the through-holes for the cylinder block 3 are also illustrated. The assembly planes 16 (for the cylinder block 4) and 16' (for the cylinder block 3) are located on the outside of the bearing tunnel upper part 1. The surface of the bearing tunnel upper part 1 is substantially planar in these assembly planes 16 and 16' so that the cylinder blocks 3 and 4 fit tightly on the bearing tunnel upper part 1 (in the assembly planes 16 and 16') in the assembled state. In the present example, two through-holes 7 are provided at each bearing point for each cylinder block. In the present example, each of the two cylinder blocks 3 and 4 comprises four cylinders. Therefore, the bearing tunnel has five bearing points. Accordingly, ten through-holes 7 are provided per cylinder block (for ten screw connections in each case).

Figure 8:
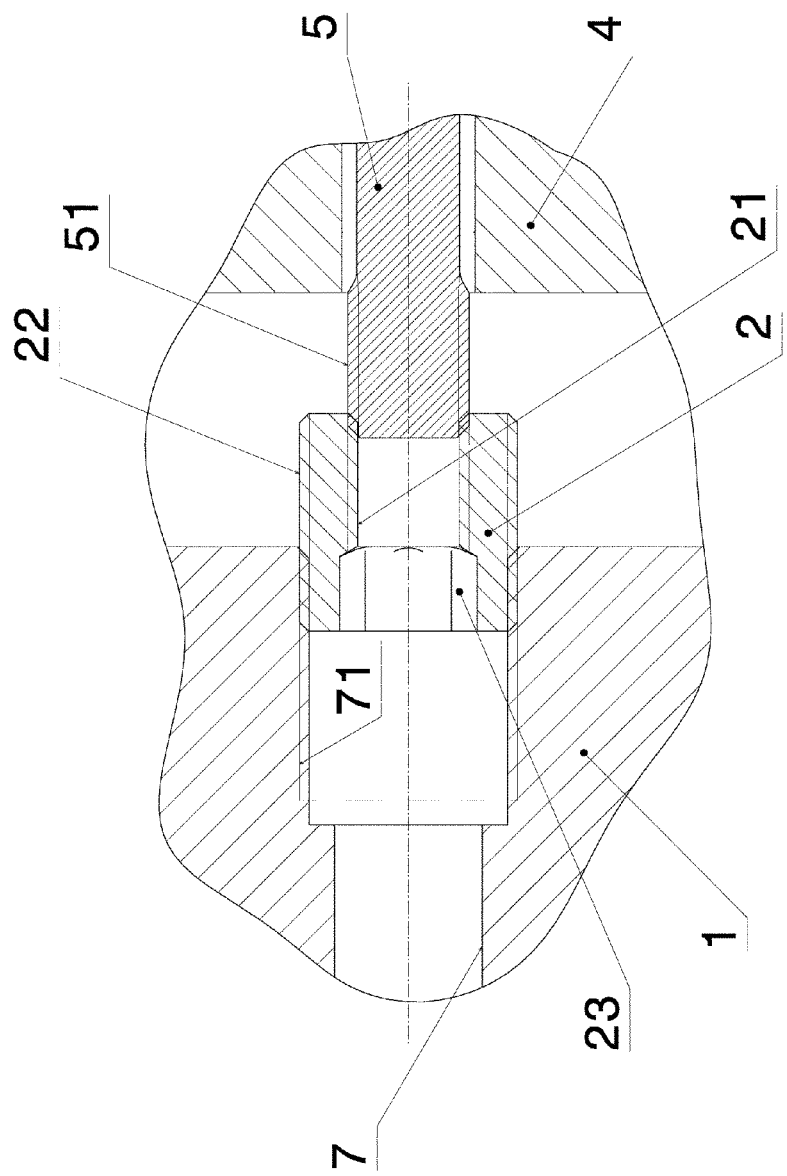
FIG. 8 shows a detail from FIG. 3 in an enlarged scale.

Each of the through-holes 7 has an internal thread 71 at the upper end thereof (i.e. at the assembly planes 16 and 16'), the internal thread being formed as a right-hand thread in the present example. A threaded sleeve 2 is screwed into each of the internal threads 71. For this purpose, each threaded sleeve 2 has an external thread 22 which, in the present example, is a right-hand thread that matches the internal thread 71. The external thread 22 extends along the entire outside of the threaded sleeve. At one end (which faces towards the cylinder blocks 3, 4), the inside of the threaded sleeves 2 has in each case an internal thread 21 which is formed as a left-hand thread 21 in the present case. At the other end of the threaded sleeves 2 (which faces towards the bearing tunnel upper part 1), a hexalobular socket 23 is arranged in each case on the inside thereof. However, other driver profiles for screws such as, e.g., a hexagon socket can also be used. The threaded sleeves 2 are designed in such a manner that they can be screwed onto the ends of the stud screws 5 which protrude from the cylinder blocks 3, 4. This means the ends of the stud screws 5, which ends protrude from the cylinder blocks 3, 4, have a left-hand thread 51 that matches the internal thread 21. The arrangement of the threaded sleeve 2 on the bearing tunnel upper part 1 and the cylinder block 4 is shown in more detail in FIG. 8 (FIG. 8 shows the detail II from FIG. 3).

For mounting the cylinder block 4 on the bearing tunnel upper part 1, the stud screws 5 are already screwed into corresponding internal threads provided in the cylinder block 4. In the present example, ten stud screws 5 are provided. The threaded sleeves 2 are screwed in first instance into the threads 71 of the through-holes 7 only so far (approx. a quarter turn) that they are fixed in the through-holes 7. The driver profiles (hexalobular socket 23) of the threaded sleeves are oriented towards the bearing tunnel. Thereafter, the cylinder head 4 including the stud screws 5 is arranged on the bearing tunnel upper part 1 in such a manner that each of the stud screws 5 is aligned coaxially to the associated through-hole 7 and engages on the internal thread 21 of the respective threaded sleeve 2. Screwdriver tools (e.g. with a hexalobular head) can be inserted through the through-holes 7 so as to engage in the driver profiles (hexalobular socket 23) in a positive-locking manner. The direction from which the screwdriver tools are inserted into the through-holes 7 during assembly of the cylinder block 4 is indicated by the arrow 24 in FIG. 4. By rotating the screwdriver tools (in the present example, a counterclockwise rotation is carried out), the threaded sleeves 2 are screwed simultaneously in a single work step, on the one hand, into the bearing tunnel upper part 1 (right-hand thread pairing with internal thread 71 and external thread 22) and, on the other hand, onto the stud screws 5 (left-hand thread pairing with internal thread 21 and external thread 51). By dimensioning the thread lengths correctly, the cylinder block 4 can thus be screwed together with the bearing tunnel upper part 1 in a single step, wherein the stud screws 5 (on the cylinder block) and the threaded sleeves 2 (on the bearing tunnel upper part 1 or alternatively on the stud screws 5) can be pre-assembled. In the present example, this assembly process takes place two times, one time for the first cylinder block 3 and one time for the second cylinder block 4.

FIG. 4 shows substantially the same cross-sectional illustration as FIG. 3, wherein, however, the threaded sleeves 2 are screwed in completely so that the cylinder block fits tightly on the bearing tunnel upper part 1. FIG. 4 also shows the hole intersections 6a between the through-holes 7 (to the cylinder block 4) and the through-holes 7' (to the cylinder block 3). These hole intersections 6a result from the limited space between the individual cylinders (next to the bearing blocks 11-15, see FIG. 2) and from the fact that the cylinder blocks 3 and 4 are constructed substantially identical.

Figure 5:
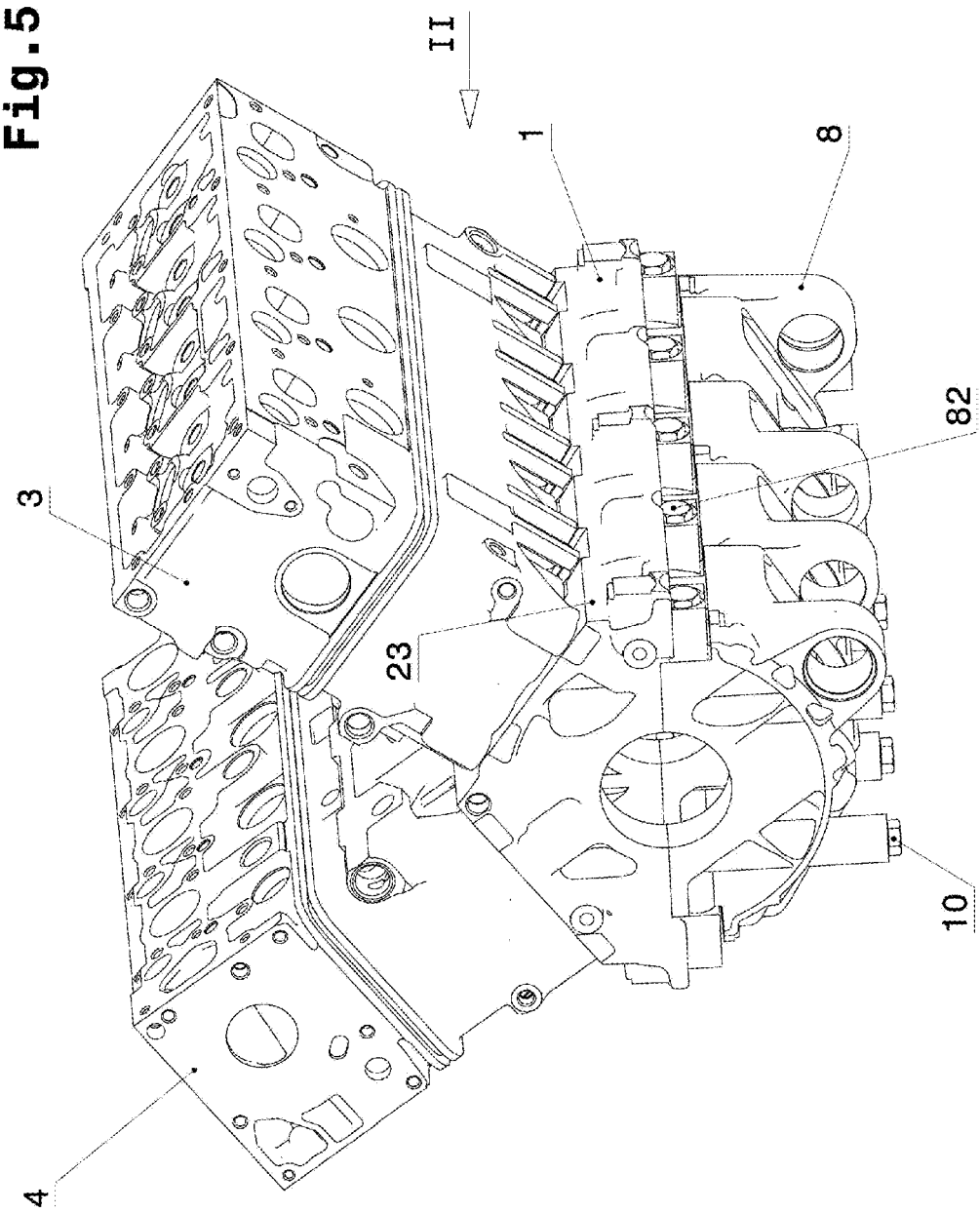
FIG. 5 shows the crankcase from FIG. 1 after assembly, including a bearing tunnel lower part in an isometric illustration.

FIG. 5 is an isometric illustration of the assembled crankcase with the cylinder blocks 3 and 4, which are screwed together with the bearing tunnel upper part 1 in the above-described manner, and with a bearing tunnel lower part 8 (bedplate) that is screwed together with the bearing tunnel upper part 1. The bearing tunnel lower part 8 comprises, among other things, bearing caps for the bearing blocks 11-15. In the assembled state, each bearing block in the bearing tunnel upper part 1 together with the associated bearing cap in the bearing tunnel lower part 8 forms a (split) bearing for receiving the crankshaft.

Figure 6:
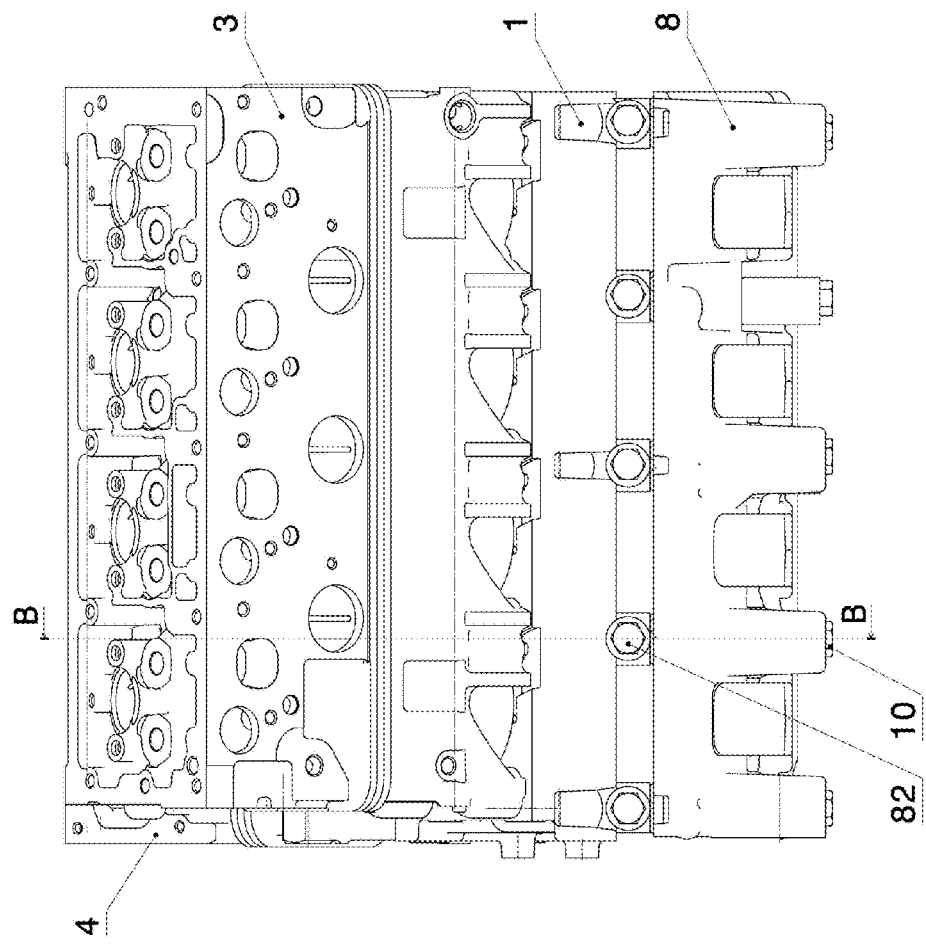
FIG. 6 shows the crankcase from FIG. 5 in a view from the right.

FIG. 6 is a side view of the example illustrated in FIG. 5 viewed from the direction designated by "II" in FIG. 5 (from the right). The main bearing screws 10 and the screws of the transverse screw connection 82 can be seen. Both serve for screwing the bearing tunnel upper 1 and the bearing tunnel lower part 8 together and are explained in more detail below with reference to FIG. 7.

Figure 7:
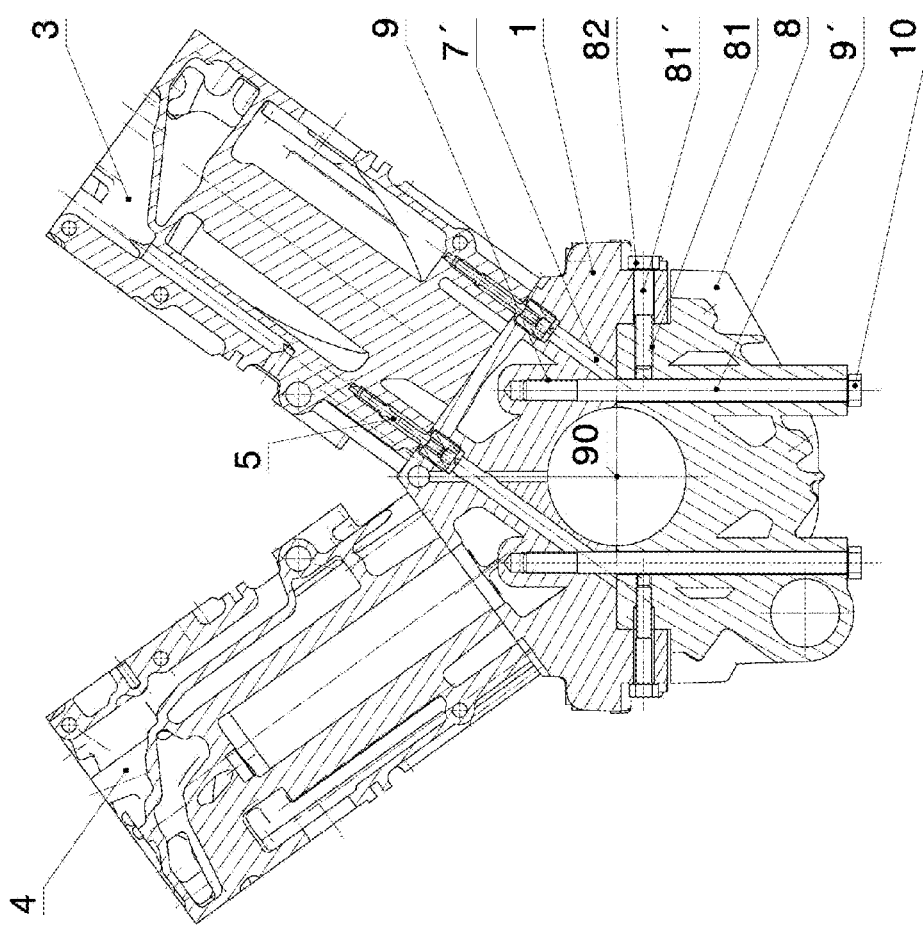
FIG. 7 shows the example from FIG. 5 in a cross-sectional illustration in which the screw connection of the bearing tunnel and the cylinder blocks is shown.

FIG. 7 shows a cross-sectional illustration (similar to FIG. 4) in which the screw connection between the two bearing tunnel parts 1 and 8 can be seen. The associated sectional plane, designated as B-B, is illustrated in FIG. 6. Threaded holes 9 are provided in bearing tunnel upper part 1 and associated (i.e. coaxial) through-holes 9' are provided in the bearing tunnel lower part 8 for fastening the two bearing tunnel parts 1, 8 to one another. Screws 10 designated as main bearing screws are fed through the through-holes 9' of the bearing tunnel lower part 8 and are screwed into threaded holes 9 of the bearing tunnel upper part 1, thereby fixing the two bearing tunnel parts to one another. Two screws 10 are provided for each bearing point in the present example so that a total of ten screws 10 are required. The threaded holes 9 in the bearing tunnel upper part likewise intersect the aforementioned through-holes 7 and 7'. The corresponding hole intersections are designated by 6*b* (see FIGS. 3 and 4).

In addition to the main bearing screw connection, a transverse screw connection, which is approximately perpendicular to the main bearing screw connection, can also be provided. For this purpose, the bearing tunnel lower part 8 has threaded holes 81. The associated through-holes 81' (coaxial to the threaded holes 81) are provided in the bearing tunnel upper part 1. The longitudinal axis of the threaded holes 81 and the through-holes 81' extends in the transverse direction, i.e., approximately perpendicular to the longitudinal axes of the main bearing screw connection. For the transverse screw connection, screws 82 are fed through the through-holes 81' in the bearing tunnel upper part 1 and are screwed into the threaded holes 81 in the bearing tunnel lower part 8. Two screws 82 for the transverse screw connection are provided for each bearing point so that ten screws 82 are required in the present example. The main bearing screws 10 and the screws 82 for the transverse screw connection 2 can each be screwed in and tightened in one step.

The method described here for screwing the cylinder blocks 3, 4 together with the bearing tunnel upper part 1 enables screwing them together from below during assembly and, at the same time, avoids space constraints which would arise in the case of a conventional screw connection. Next to the bearing blocks 11 to 15 (see FIG. 2), the holes 7 and 7' as well as the threaded hole 9 (see FIGS. 4 and 7, intersections 6*b*) intersect (due to lack of space, the holes cannot be arranged next to one another). In order to be able to screw the screws 10 of the main bearing screw connection into the threaded hole 9, the through-holes 7 and 7' must be clear. Due to the use of the above-described threaded sleeves 2, the through-holes 7 and 7' are closed by the screwdriver tools (cf. FIG. 4, arrow 24) only during assembly. Thereafter, the screwdriver tools are removed and the screws 10 can be screwed in without any problems.

The invention claimed is:

1. A method for assembling a multi-part crankcase, the method comprising:
   providing a cylinder block having a plurality of threaded holes, in each of which a stud screw is screwed, wherein the stud screws protrude from the cylinder block;
   providing a bearing tunnel upper part having a plurality of through-holes, wherein each of the through-holes is arranged coaxially to a corresponding stud screw and wherein, on a side facing the cylinder block, each of through-holes has an internal thread having a first direction of rotation;
   providing a plurality of threaded sleeves with an internal thread that has a second direction of rotation, with a driver profile for inserting a screwdriver tool in a positive-locking manner, and with an external thread having a first direction of rotation;
   positioning the bearing tunnel upper part, the cylinder block and the threaded sleeves in such a manner that the threaded sleeves are arranged between and coaxially to the stud screws and the through-holes;
   inserting the screwdriver tool into the driver profile of one of the threaded sleeves and rotating the threaded sleeve, whereby the threaded sleeve is screwed into the internal thread of the through-hole and is screwed onto the stud screw.

2. The method according to claim 1, the method further comprising:
   providing a further cylinder block having a plurality of threaded holes into each of which a stud screw is screwed, wherein the stud screws protrude from the cylinder block;
   providing further threaded sleeves with an internal thread that has a second direction of rotation, and with a driver profile for inserting a screwdriver tool in a positive-locking manner;
   positioning the further cylinder block and the further threaded sleeves in such a manner that the further threaded sleeves are arranged between and coaxially to the stud screws and the further through-holes are provided in the bearing tunnel upper part;
   inserting the screwdriver tool into at least one driver profile of one of the further threaded sleeves and rotating the threaded sleeve, whereby the threaded sleeve is screwed into the internal thread of the further through-hole and is screwed onto the stud screw.

3. The method according to claim 1, the method further comprising:
   providing a bearing tunnel lower part and joining the bearing tunnel lower part and the bearing tunnel upper part so that bearing blocks arranged in the bearing tunnel upper part and bearing caps arranged in the bearing tunnel lower part form corresponding bearing points for a crankshaft; and
   screwing together the bearing tunnel lower part and the bearing tunnel upper part.

4. The method according to claim 3, wherein screwing together the bearing tunnel lower part and the bearing tunnel upper part comprises:
   screwing the main bearing screws into threaded holes of the bearing tunnel upper part through corresponding through-holes in the bearing tunnel lower part.

5. The method according to claim 3, wherein screwing together the bearing tunnel lower part and the bearing tunnel upper part comprises:

screwing in further screws into threaded holes of the bearing tunnel lower part through corresponding through-holes in the bearing tunnel upper part.

6. A crankcase comprising the following:
- a cylinder block having a plurality of threaded holes into each of which a cylinder block stud screw is screwed, wherein the cylinder block stud screws protrude from the cylinder block;
- a bearing tunnel upper part having at least two bearing blocks arranged along a longitudinal axis, and having a plurality of through-holes, wherein each of the through-holes is arranged coaxially to a corresponding cylinder block stud screw, and wherein, on a side facing the cylinder block, each of the through-holes has an internal thread having a first direction of rotation;
- a plurality of threaded sleeves with an external thread that has a first direction of rotation, with an internal thread that has a second direction of rotation, and with a driver profile for inserting a screwdriver tool in a positive-locking manner;
- wherein the external thread of each threaded sleeve is screwed together with the internal thread of a corresponding through-hole, and the internal thread of each threaded sleeve is screwed together with the corresponding cylinder block stud screw.

7. The crankcase according to claim 6, wherein the through-holes oriented towards the cylinder block and further through-holes oriented towards a further cylinder block form hole intersections in the bearing tunnel upper part.

8. The crankcase according to claim 6, further comprising:
- a bearing tunnel lower part that is screwed together with the bearing tunnel upper part in such a manner that the bearing blocks arranged in the bearing tunnel upper part together with the bearing caps arranged in the bearing tunnel lower part form corresponding bearing points for a crankshaft.

9. The crankshaft according to claim 8, wherein the bearing tunnel upper part has threaded holes into which main bearing screws are screwed for fastening the bearing tunnel lower part, wherein each of the threaded holes forms further threaded hole intersections with the through-holes oriented towards the cylinder block.

10. The crankcase according to claim 6, wherein the crankcase is part of a V engine.

11. The crankcase according to claim 6, wherein the external thread of each threaded sleeve is a right-hand thread and the internal thread of each threaded sleeve is a left-hand thread.

12. The crankcase according to claim 6, wherein the external thread of each threaded sleeve is a left-hand thread and the internal thread of each threaded sleeve is a right-hand thread.

13. The crankcase according to claim 6, wherein a driver profile for inserting a screwdriver tool in a positive-locking manner is a socket accepting insertion of a screw driver.

14. A crankcase comprising the following:
- a first cylinder block and a second cylinder block, each having a plurality of threaded holes into each of which a cylinder block stud screw is screwed, wherein the stud screws protrude from the first and second cylinder blocks;
- a bearing tunnel upper part having at least two bearing blocks arranged along a longitudinal axis, a plurality of through-holes oriented towards the first cylinder block, and a plurality of further through-holes oriented towards the second cylinder block, wherein each of the through-holes and further through-holes is arranged coaxially to a corresponding cylinder block stud screw, and wherein, on a side facing the cylinder block, each of the through-holes has an internal thread having a first direction of rotation;
- a plurality of threaded sleeves with an external thread that has a first direction of rotation, with an internal thread that has a second direction of rotation, and with a driver profile for inserting a screwdriver tool in a positive-locking manner;
- wherein the external thread of each threaded sleeve is screwed together with the internal thread of the corresponding through-hole, and the internal thread of each threaded sleeve is screwed together with a corresponding cylinder block stud screw.

15. The crankcase according to claim 14, wherein the through-holes oriented towards the first cylinder block and the further through-holes oriented towards the second cylinder block form hole intersections in the bearing tunnel upper part.

16. The crankcase according to claim 14, the crankcase further comprising:
- a bearing tunnel lower part that is screwed together with the bearing tunnel upper part in such a manner that the bearing blocks arranged in the bearing tunnel upper part together with the bearing caps arranged in the bearing tunnel lower part form corresponding bearing points for a crankshaft.

17. The crankshaft according to claim 16, wherein the bearing tunnel upper part has threaded holes into which main bearing screws are screwed for fastening the bearing tunnel lower part, wherein each of the threaded holes forms further threaded hole intersections with the through-holes oriented towards the first cylinder block and/or with the through-holes oriented towards the second cylinder block.

18. The crankcase according to claim 14, wherein the crankcase is part of a V engine.

* * * * *